United States Patent
Oh et al.

(10) Patent No.: US 9,734,218 B2
(45) Date of Patent: Aug. 15, 2017

(54) SPIRAL LISTING OF ITEMS

(71) Applicant: Amazon Technologies, Inc., Reno, NV (US)

(72) Inventors: Minsoo Oh, Seattle, WA (US); Mario Vargas Adoc, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 515 days.

(21) Appl. No.: 14/310,449

(22) Filed: Jun. 20, 2014

(65) Prior Publication Data
US 2014/0304255 A1    Oct. 9, 2014

Related U.S. Application Data

(63) Continuation of application No. 13/161,112, filed on Jun. 15, 2011, now Pat. No. 8,775,264.

(51) Int. Cl.
| | |
|---|---|
| *G06Q 30/00* | (2012.01) |
| *G06F 17/30* | (2006.01) |
| *G06F 3/0481* | (2013.01) |
| *G06F 3/0484* | (2013.01) |
| *G06F 3/0482* | (2013.01) |

(52) U.S. Cl.
CPC ...... *G06F 17/30554* (2013.01); *G06F 3/0481* (2013.01); *G06F 3/0482* (2013.01); *G06F 3/04842* (2013.01); *G06F 17/30274* (2013.01); *G06Q 30/00* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | | |
|---|---|---|---|---|
| 8,332,284 | B1 * | 12/2012 | Runo | ................ G06Q 30/0603 |
| | | | | 705/27.2 |
| 2009/0313088 | A1 * | 12/2009 | Ali | ........................ G06Q 30/02 |
| | | | | 705/26.1 |
| 2011/0060666 | A1 * | 3/2011 | Gromek | ................ G06F 3/0482 |
| | | | | 705/27.2 |

OTHER PUBLICATIONS

Battiato, S., Farinella, M., Guiffrida, G., Sismeiro, C. and Tribulato, G., "Using Visual and Text Features for Direct Marketing on Multimedia Messaging Services Domain" (Multimedia Tools and Applications 42.1 (Mar. 2009): 5-30).

* cited by examiner

*Primary Examiner* — Ethan D Civan
(74) *Attorney, Agent, or Firm* — Thomas Horstemyer, LLP

(57) ABSTRACT

Disclosed are various embodiments for rendering images of items in a ranked listing as a spiral on a network page. In one embodiment, a page builder ranks a listing of items according to a criterion provided by the user and generates a network page that depicts a spiral comprising a plurality of images, where each image is associated with one of the items in the ranked listing. The page builder arranges the images such that the image associated with the highest ranked item is located at the center of the spiral and the remaining images are arranged along a path of the spiral in decreasing order according to the ranking of the items associated with each of the respective remaining images. In addition, the page builder embeds a client side application that renders a shifting of the images when an image is selected by the user.

20 Claims, 5 Drawing Sheets

SPIRAL LISTING OF ITEMS

CROSS-REFERENCE TO RELATED APPLICATIONS

This application is a continuation of and claims priority to U.S. application Ser. No. 13/161,112 titled "Spiral Listing of Items," filed Jun. 15, 2011, which is incorporated herein by reference in its entirety.

BACKGROUND

Users may browse items on web pages presented by electronic commerce systems in order to identify items for purchase. Typically, search results listing a number of items are presented. Users often select from the items to view a detail page presenting more detailed information about such items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to browsing a listing of items available in an electronic commerce system where the listing of items is presented in a spiral format. In one embodiment, a page builder is executed to generate a network page that presents the items arranged in a spiral. The items are placed in a ranked order, where a highest ranked item is located at a center of the spiral. In addition, the remaining items are positioned along the path of the spiral according to the ranking of the items. Further, a client side application is embedded within the network page that renders a shifting of the images upon a selection of one or more of the images in the spiral. In the following discussion, a general description of the system and its components is provided, followed by a discussion of the operation of the same.

Figure 1:
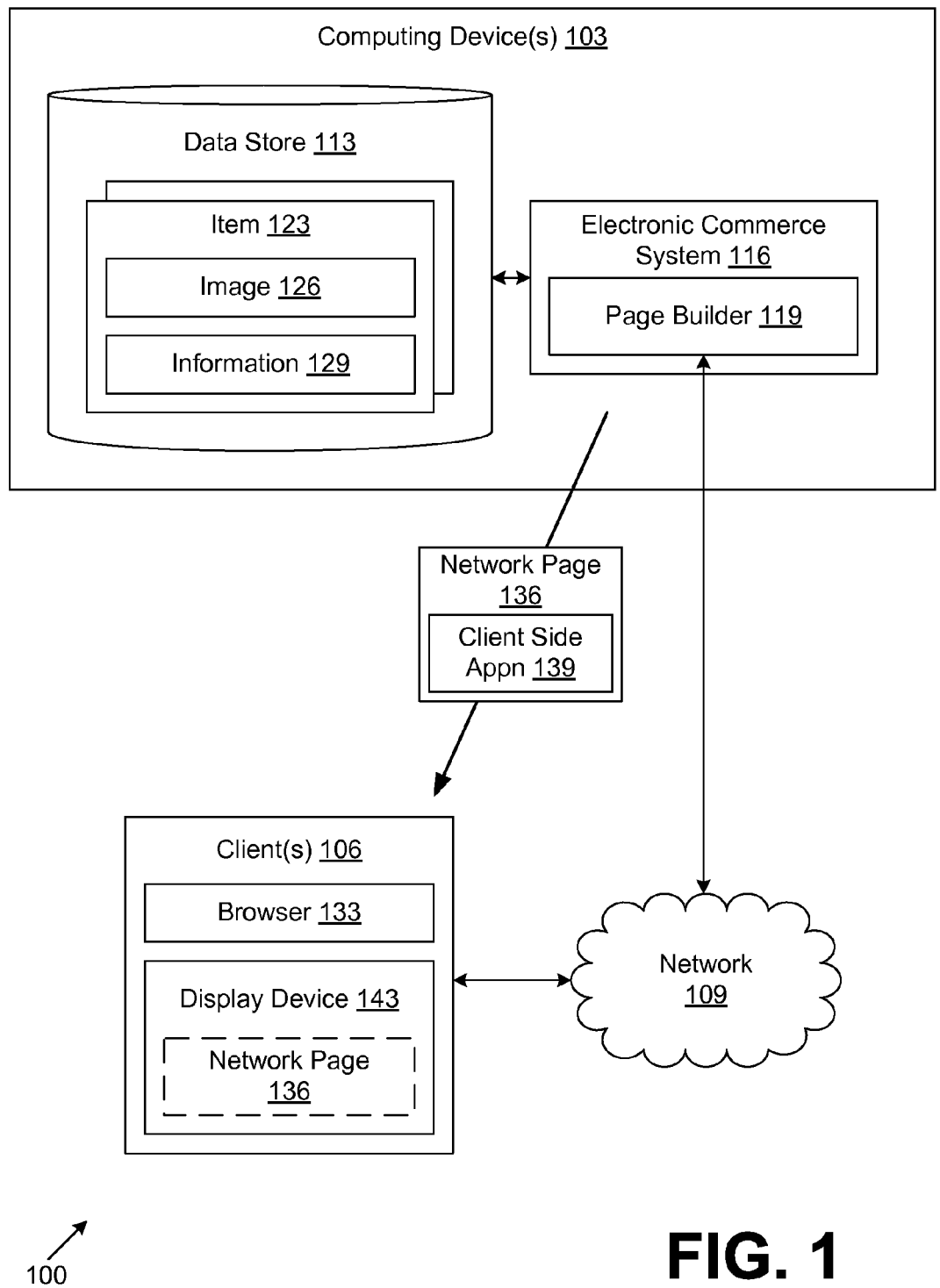
FIG. 1 is a drawing of networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 116, and other applications, services, processes, systems, engines, or functionality not discussed in detail herein. The electronic commerce system 116 includes various components such as a page builder 119 and other applications and processes.

The electronic commerce system 116 is executed in order to facilitate the online purchase of items over the network 109. The electronic commerce system 116 also performs various backend functions associated with the online presence of a merchant in order to facilitate the online purchase of items 123 as will be described. For example, the electronic commerce system 116 generates network pages 136 such as web pages or other types of network content that are provided to clients 106 for the purposes of selecting items for purchase, rental, download, lease, or other form of consumption as will be described.

Additionally, the page builder 119 is configured to generate the network pages 136 such as web pages and/or client side applications 139 in response to requests such as HTTP requests from the client 106 in association with the operation of the electronic commerce system 116. Such network pages and/or client side applications may be rendered and/or executed on the client device 106 for various purposes. In one embodiment, the client side applications 139 may be embedded within network pages 136 such as web pages and the like, as will be described. Alternatively, such client side applications 139 may be transmitted to the client device 106 in some other format to be executed thereon.

The data stored in the data store 113 includes, for example, a catalog of items 123, and potentially other data. Each of the items 123 is sold, for example, to customers through the electronic commerce system 116. Associated with each item 123 is an image that may depict, for example, one or more views of the item 123 that is available for purchase in the electronic commerce system 116. Also associated with each item 123 is information 129 that may comprise, for example, detail information about the item 123, purchasing information, shipping information, preferences specific to item 123, and/or any other information related to item 123. For instance, purchasing information may include pricing information, discount information, methods of payment, and/or any other information related to the item 123. Further, shipping information may include shipping discounts, projected dates of delivery, forms of delivery, carrier information, and/or any other information related to shipping the item 123. Additionally preferences specific to item 123 may include a size preference, a color preference, a design preference, and/or any other preference that may be specific to the item 123.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 133 and/or other applications. The browser 133 may be executed in a client 106, for example, to access and render network pages, such as web pages, or other network content served up by the computing device 103 and/or other servers. The rendered network pages 136 or other content are viewed on a display device 143. In one embodiment, the network page 136 includes the client side application 139 that implements a variety of functions that dictate how a network page 136 is rendered and how users may interact with the network page 136 as will be described. The client side application 139 may be embedded in the network page 136 that is executed as needed. Further, the client side application 139 may access functionality of the browser 133 for various purposes as will be described. In this respect, the functionality of the browser 133 may be viewed as an extension of the client side application 139.

In another embodiment, the client side application 139 may not be embedded in the network page 136 and instead may be provided to and executed by the client 106 in some other manner. The client 106 may be configured to execute applications beyond browser 133 such as, for example, email applications, instant message applications, and/or other applications.

Next, a general description of the operation of the various components of the networked environment 100 is provided. A user on client 106 may manipulate the browser 133 to submit a request for an item search to the electronic commerce system 116. Upon performing the item search, one or more items 123 may be responsive to the request that may be presented to the user. The page builder 119 generates a network page 136 to present the results of the search to the user. According to various embodiments, the network page 136 includes the client side application 139. The network page 136 is sent to the client device 106 in response to the request. The network page 136 is rendered in order to facilitate viewing of the items 123 on the display device 143 of the client device 106. The client side application 139 is executed during the rendering of the network page 136 and controls the presentation of the items 123 on the display device 143 as will be described.

Figure 2:
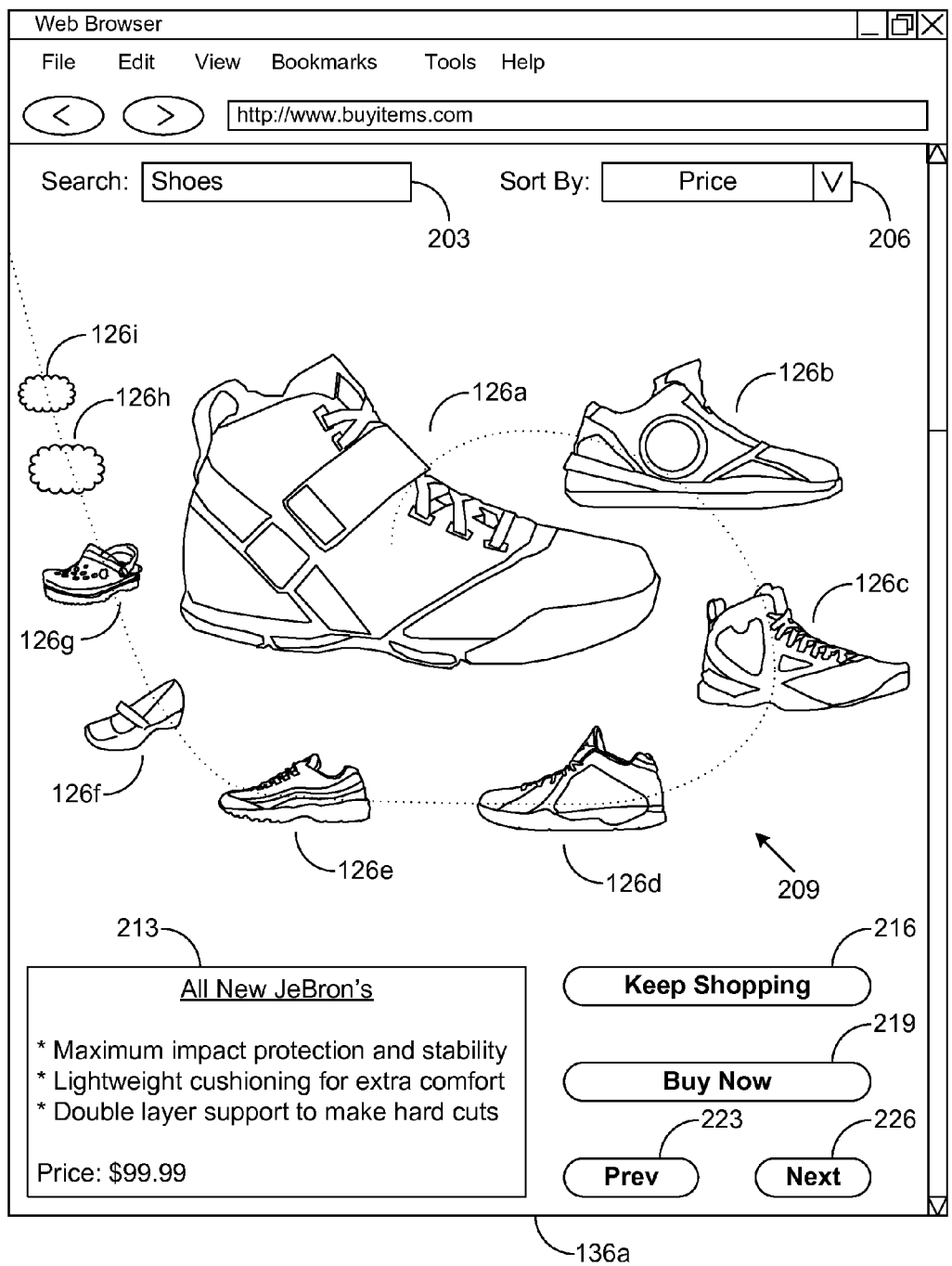
FIGS. 2 and 3 are drawings illustrating examples of a user interface rendered by a client in the networked environment of FIG. 1 according to various embodiments of the present disclosure.

Referring next to FIG. 2, shown is one example of a network page 136, denoted herein as network page 136a, according to various embodiments of the present disclosure. The various graphical components such as the blocks comprising different information shown in FIG. 2 are merely examples of the various types of features that may be used to accomplish the specific functions noted. The network page 136 is rendered on a display device 143 associated with the client 106 (FIG. 1) according to various embodiments. In another embodiment, FIG. 2 may be viewed as depicting the display output of the client side application 139 (FIG. 1), according to various embodiments of the present disclosure.

In one embodiment, the page builder 119 (FIG. 1) generates the network page 136a to display the results of a request for an item search submitted to the electronic commerce system 116 (FIG. 1). As shown, the network page 136a displays the results as a listing of items arranged in a spiral. In one embodiment, the network page 136a comprises a search field 203, a criteria field 206, a spiral 209 comprised of images 126 (FIG. 1) of items 123 (FIG. 1), a detail box 213, a keep shopping button 216, a buy now button 219, a previous button 223, and a next button 226.

In one embodiment, a user may provide a search term in the search field 203 that transmits a request to the electronic commerce system 116 for a listing of items 123 that match the search term. In this example, "shoes" serves as the search term being used to transmit the request to the electronic commerce system 116. Additionally, the criteria field 206 may be used to select one or more criteria for ranking the items 123. In this example, the criterion for ranking the items 123 is the price. In one embodiment, the user may select more than one criterion for ranking the items 123 such as, for instance, availability of the items, customer rating of the items, and/or any other criterion related to browsing for items 123 in an electronic commerce system 116.

Upon transmitting the request to the electronic commerce system 116, the client side application 139 receives the items 123 satisfying the search term and includes the items 123 in the network page 136a. In one embodiment, the client side application 139 may receive all of the items 123 satisfying the search term and any corresponding information 129 (FIG. 1) of the items 123 which may be stored in a memory accessible by the client 106. In another embodiment, the client side application 139 may receive a predetermined number of items 123 satisfying the search term and any corresponding information 129.

In one embodiment, the items 123 are presented in a spiral 209 having a first image 126a at the center of the spiral 209. The first image 126a at the center of the spiral 209 represents the highest ranked item 123 according to the one or more criterion provided by the user in the criteria field 206. For instance, the first image 126a may correspond to the most expensive item 123. The remaining images 126 are positioned around the first image 126a to form the spiral 209. In particular, the images 126 appearing along the path of the spiral 209 are ranked according to the one or more criterion provided by the user. For instance, a second image 126b corresponds to the second highest ranked item 123, a third image 126c corresponds to the third highest ranked item 123, and so forth. Thus, a last image 126i corresponds to the lowest ranked item 123. For instance, the last image 126i may correspond to the least expensive item 123.

Additionally, in one embodiment, the size of the image 126 corresponding to the highest ranked item 123 may be greater than any of the other images 126 that comprise the spiral 209. The sizes of each of the other images 126 may decrease in size according the ranking determined by the page builder 119. For instance, the first image 126a corresponding to the highest ranked item 123 is the largest image 126 in the spiral 209. Further, the second image 126b corresponding to the second highest ranked item 123 is the second largest image 126 in the spiral 209. Similarly, the last image 126i corresponding to the lowest ranked item 124 is the smallest image 126 in the spiral 209. In another embodiment, the images 126 of the spiral 209 may be in contact with each other such that there is no open space between the images 126, thereby forming a continuous spiral 209. In a further embodiment, a portion of each of the images 126 may be overlapping with the respective adjacent images 126 to form the spiral 209.

In another embodiment, the images 126 of the spiral 209 may vary in other ways such as transparency, color, and/or any other style or format to indicate an order for a ranking. For instance, the first image 126a corresponding to the highest ranked item 123 may appear in bold while the last image 126i corresponding to the lowest ranked item 123 may appear to be close to transparent. Further, the transparency of each of the images 126 in the spiral 209 may correspond to the ranking of items 123 associated with each of the images 126. Similarly, a color scheme for each of the images 126 may indicate a ranking of the items, such as, for example, varying shades of colors.

In another embodiment, the images 126 of the spiral 209 may be configured to form a three-dimensional spiral structure. For example, the location and size of each of the images 126 in the three-dimensional spiral may correspond to the ranking of each of the items 123 associated with the respective images 126, as described above. In addition, an image 126 associated with the highest ranked item 123 may be at the center of the three-dimensional spiral. In one embodiment, the three-dimensional spiral may be a hologram rendered on the display device 143.

Furthermore, the network page 136a also includes the detail box 213 that depicts detailed information 129. In one embodiment, the detail box 213 depicts the information 129 associated with the image 126 at the center of the spiral 209. For instance, the first image 126a is located at the center of the spiral 209. As such, the detail box 213 depicts the information 129 that corresponds to the first image 126a. In one embodiment, the user may select another image 126 in the spiral 209 to receive additional information 129 corresponding to the selected image 126. In this example, the client side application 139 may shift the selected image 126 to the center of the spiral 209 and refresh the detail box 213 to correspond with the selected image 126, as will be described with respect to FIG. 3.

In addition, the network page 136a includes a keep shopping button 216 that, for instance, allows the user to continue browsing other items 123. The buy now button 219 allows the user to purchase the item 126 depicted at the center of the spiral 209. For instance, the user may review the information 129 depicted in the detail box 213 corresponding to the image 126 depicted at the center of the spiral 209 and purchase the item 123. Finally, the previous button 223 and the next button 226 allow the user to view other items 123 depicted in the spiral 209, as will be described with respect to FIG. 3. For instance, the previous button 223 and the next button 226 function as a navigation control panel that allows the user to view the other images 126. In another embodiment, the navigation control panel may be a dial depicted on the network page 136a, a scroll wheel and/or scroll bar associated with the client 106, and/or any other design that provides for navigating the spiral 209.

Figure 3:
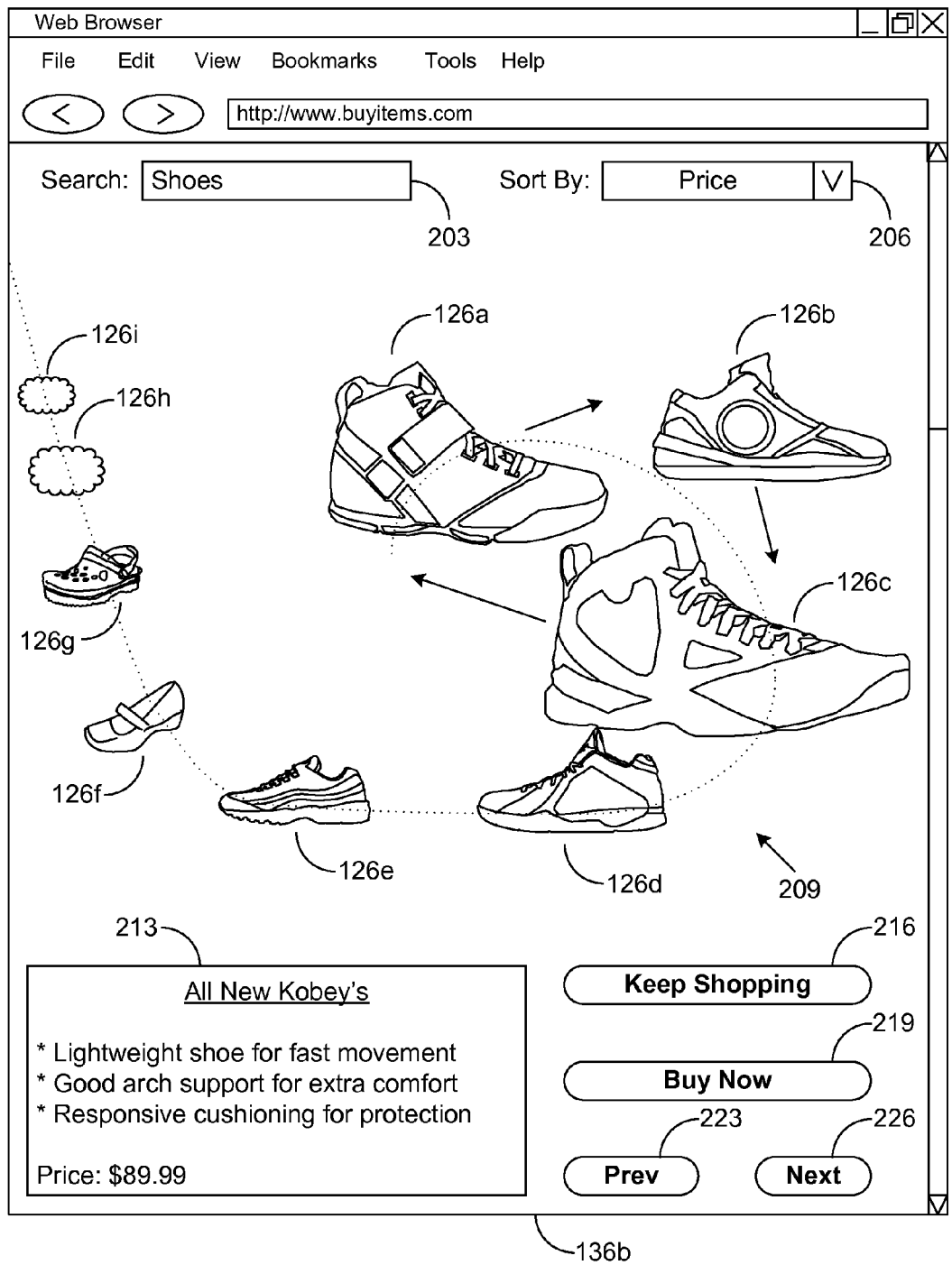

Turning now to FIG. 3, shown is one example of a network page 136, denoted herein as network page 136b, according to various embodiments of the present disclosure. The various graphical components such as the blocks comprising different information shown in FIG. 3 are merely examples of the various types of features that may be used to accomplish the specific functions noted. The network page 136 is rendered on a display device 143 associated with the client 106 (FIG. 1) according to various embodiments. In another embodiment, FIG. 3 may be viewed as depicting the display output of the client side application 139 (FIG. 1), according to various embodiments of the present disclosure.

In one embodiment, the network page 136b of FIG. 3 shows a shifting of the images 126 such that the network page 136 maintains the ranked spiral 209 (FIG. 1). For example, the user may select the third image 126c to request information 129 associated with the third image 126, browse the item 123 associated with the third image 126c, purchase the item 123 associated with the third image 126c, and/or for any other purpose. Upon receiving the selection, the client side application 139 shifts the images 126 as depicted in network page 136b.

In one embodiment, as shown in the network page 136b, the client side application 139 shifts the selected third image 126c to the center of the spiral 209. Contemporaneously, the client side application 139 shifts the first image 126a out of the center of the spiral 209. For instance, the client side application 139 may shift the first image 126a to a location out of the center of the spiral 209 and into a location that corresponds with the rank associated with the item 123 depicted by the first image 126. In this example, the first image 126a depicts the highest ranked item 123. As such, the client side application 139 shifts the first image 126a to the first location along the path of the spiral 209, as show in network page 136b. Furthermore, the client side application 139 may also contemporaneously shift the remaining images 126 in the spiral 209 to maintain the ranking of the images 126 of the spiral 209, as described above. For example, the client side application 139 shifts the second image 126b out the first location along the path of the spiral 209 to a location that corresponds with the rank associated with the item 123 depicted by the second image 126. Here, the second image 126b corresponds to the second highest ranked item 123. As such, the client side application 139 shifts the second image 126b to a location adjacent to the first image 126a along the spiral 209.

In another embodiment, the client side application 139 resizes the images 126 such that the spiral 209 maintains the order of sizes of the images 126 in the spiral 209. As shown in network page 136b, the client side application 139 enlarges the selected third image 126c such that the third image 126c becomes the largest image in the spiral 209. Contemporaneously, the client side application 139 resizes the remaining images 126 to maintain the order of the sizes of the images 126 in the spiral 209. For instance, the client side application 139 shrinks the first image 126a such that the size of the first image 126a corresponds to the rank of the item 123 associated with the first image 126a. In this example, the first image 126a is associated with the highest ranked item 126. As such, the client side application 139 resizes the first image 126a to be the largest image 126 in the spiral 209, notwithstanding the size of the image 126 at the center of the spiral 209. Further, the client side application 139 resizes the remaining images 126 of the spiral 209 to correspond with the rank of the item 123 associated with each of the respective images 126, as described above.

In another embodiment, the client side application 139 may alter the images 126 of the spiral 209 in other ways and still maintain the order of the ranking of the images 126, such as, for instance, depicting images with varying degrees of transparency. For example, the client side application 139 may embolden the third image 126c such that the third image 126c becomes the boldest image in the spiral 209. Contemporaneously, the client side application 139 may alter the remaining images 126 to maintain the order of the transparency of the images 126 in the spiral. For instance, the client side application 139 may make the first image 126*a* more transparent such that the transparency of the first image 126*a* corresponds to the rank of the item 123 associated with the first image 126*a*. Similarly, the client side application 139 may alter the transparency of the remaining images 126 of the spiral according to the order of the ranking. In another embodiment, the client side application 139 may alter the images 126 according to a shade of color, such as, for example, applying different shades of a particular color to designate an order of the ranking.

Additionally, the client side application 139 depicts the information 129 in the detail box 213 that is associated with the image 126 appearing in the center of the spiral 209. For instance, the client side application 139 depicts the information 129 associated with the selected third image 126*c* in the detail box 213. In addition, the network page 136*b* includes the keep shopping button 216 and the buy now button 219, as described above, for browsing items 123 in the electronic commerce system 116.

In one embodiment, the previous button 223 and the next button 226 may be used as navigation controls to browse the images 126 depicted in the spiral 209. For instance, the user may manipulate the next button 226 to browse to the next sequential image 126 in the spiral 209. Upon manipulating the next button 226, the client side application 139 may shift the images 126 to maintain the ranked order of items 123, as described above. In addition, the client side application 139 may also replace the information 129 depicted in the detail box 213 to correspond with the next sequential image 126. Further, the user may manipulate the previous button 229 to browse to the previous sequential image 126 in the spiral 209, in a similar manner. In another embodiment, the navigation controls may appear as a dial on the network page 136*b* that may be rotated clockwise or counter clockwise to shift the images 126 of the spiral 209. In yet another embodiment, the navigation controls may be a scroll wheel and/or a scroll bar that may be associated with the client 106.

In another embodiment, the client side application 139 may remove the items 123 ranked higher than the item 123 associated with the selected image 126. For instance, using the example from above, the items 123 associated with the first image 126*a* and second image 126*b* are ranked higher than the item 123 associated with the selected third image 126*c*. In this example, the client side application 139 may remove the first image 126*a* and the second image 126*c* out of the spiral 209 and introduce new images 126 to include in the spiral 209. For instance, the client side application 139 may introduce two additional images 126*j*/126*k* into the spiral 209 and include the images 126*j*/126*k* in a location in the spiral 209 that corresponds to the rank of the item 123 associated with the images 126*j*/126*k*. Here, the client side application 139 may include the images 126*j*/126*k* at the tail end of the spiral 209.

In addition, upon removing the images 126 associated with items 123 ranked higher than the item 123 associated with the selected image 126, the client side application 139 may contemporaneously render the shifting of the remaining images 126 in the spiral 209. In one embodiment, the client side application 139 may rotate the images 126 in a counter clock-wise direction along the path of the spiral 209 such that the selected third image 126*c* appears at the center of the spiral 209. In addition, the client side application 139 may shift the images 126 appearing sequentially after the selected third image 126*c* along the path of the spiral 209 to a location that corresponds to the ranking of the item 123 associated with each of the respective images 126.

Figure 4:
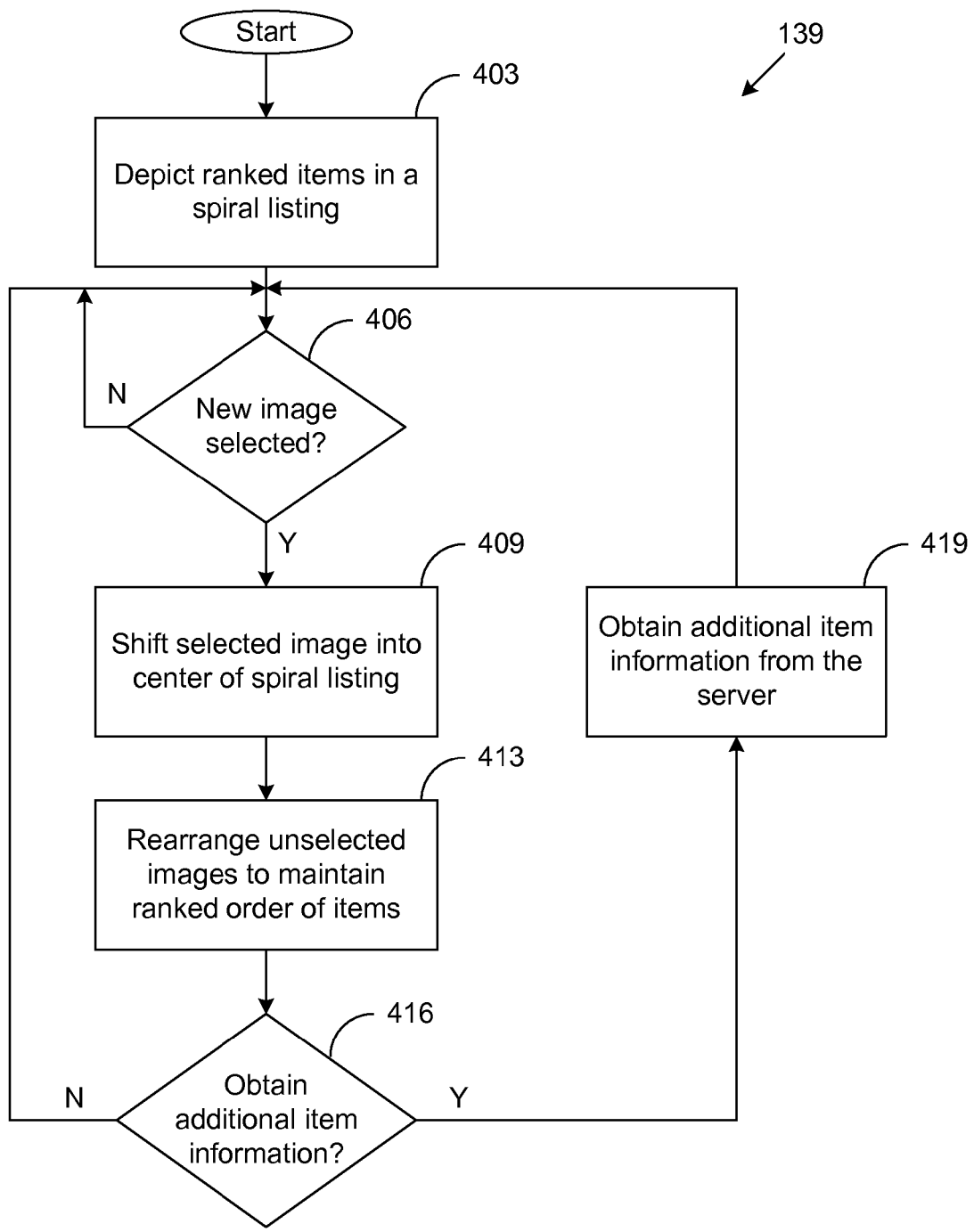
FIG. 4 is a flowchart illustrating one example of functionality implemented as portions of a client side application executed in a computing device in the networked environment of FIG. 1 according to various embodiments of the present disclosure.

Referring next to FIG. 4, shown is a flowchart that provides one example of the operation of a portion of the client side application 139 according to various embodiments. It is understood that the flowchart of FIG. 4 provides merely an example of the many different types of functional arrangements that may be employed to implement the operation of the portion of the client side application 139 as described herein. As an alternative, the flowchart of FIG. 4 may be viewed as depicting an example of steps of a method implemented in the computing device 103 (FIG. 1) according to one or more embodiments.

According to one embodiment, the page builder 119 (FIG. 1) generates a network page 136 (FIG. 1) that provides a listing of ranked items 123 (FIG. 1) available for purchase in an electronic commerce system 116 (FIG. 1) where the ranked items 123 may be presented as a spiral 209 (FIG. 2). Embedded in the network page 136 is the client side application 139 that shifts images 126 (FIG. 1) included in the spiral 209 based on a selection of an image 126 provide by a user on a client device 106 (FIG. 1).

Beginning with box 403, the client side application 139 depicts the ranked items 123 in a spiral 209, as seen in FIG. 2. For example, the items 123 may be ranked according to a criterion provided by a user on the client device 106. In one embodiment, the client side application 139 may depict an image 126 of a highest ranked item 123 at the center of the spiral. Further, the client side application 139 may include additional images 126 along the path of the spiral 209 where the order of the images 126 corresponds to the ranking of the items 123 associated with the respective images 126. For instance, the client side application 139 may configure the spiral 209 such that the images 126 along the spiral are presented in a decreasing order of ranked items 123, as described above.

In another embodiment, the client side application 139 may size the images 126 according to the ranking of the items 123 associated with each of the images 126. For instance, the client side application 139 may size the image 126 associated with the highest ranked item 123 to be the largest sized image 126 in the spiral 209. Similarly, the client side application 139 may shape the image 126 associated with the lowest ranked item 123 to be the smallest sized image 126 in the spiral 209, as described above. Additionally, the client side application 139 may also depict detailed information 129 associated with the image 126 located at the center of the spiral 209, such as, for instance, the image 126 associated with the highest ranked item 123.

Next, in box 406, the client side application 139 determines if an image 126 in the spiral 209 is selected by the user. In one embodiment, the user may request to view detailed information 129 associated with an image 126 in the spiral 209 by selecting the image 126 and/or manipulating the navigation controls included on the network page 136. For example, the user may manipulate the next button 226 and/or the previous button 223. The client side application 139 determines if the user requested to view detailed information 129 associated with an image 126 in the spiral 209 and proceeds to box 409 if the selection is received. An inactivity timeout period may be associated with the client side application 139 in the event that the user does not select another image 126, or the network page 136 may remain static until action is taken.

In box 409, the client side application 139 shifts the selected image 126 into the center of the spiral 209 in response to the user selection. For example, the client side application 139 may shift an image 126 already present at the center of the spiral 209 out of the center and shift the selected image 126 into the center. In one embodiment, the client side application 139 may contemporaneously shift the selected image 126 to the center of the spiral 209 and resize the selected image 126 to be the largest image 126 in the spiral 209, as described above. Additionally, the client side application 139 may also depict the information 129 associated with the selected image 126 in the detail box 213.

Next, in box 413, the client side application 139 may rearrange the unselected images 126 of the spiral 209 to maintain the ranked order of items 123. In one embodiment, the client side application 139 rearranges the images 126 not located at the center of the spiral 209 where each image 126 is placed at a location along the spiral 209 that corresponds to the rank of the item 123 associated with each of the respective images 126. For instance, the image 126 associated with the highest ranked item 123 not located at the center of the spiral 209 may occupy the first sequential location along the spiral 209 adjacent to the center. Similarly, the image 126 associated with the lowest ranked item 123 not located at the center of the spiral 209 may occupy the last sequential location along the spiral 209, such as the tail end of the spiral 209. In another embodiment, the client side application 139 may contemporaneously alter the images 126 according to the ranking of the items 123 associated with each of the respective images 126, as described above. For instance, the client side application 139 may alter the images 126 by resizing the images, changing a degree of transparency of the images, shading of the images, and/or alter the images in any other manner.

In box 416, the client side application 139 determines whether to obtain additional item information. In one embodiment, the client side application 139 may remove all images 126 associated with items 123 ranked higher than the item 123 associated with the selected image 126 from the spiral 209 and replace the removed images 126 with additional images 126 received from the electronic commerce system 116. For example, the client side application 139 may include the additional images 126 in the spiral 209 according to the ranking of the items 126 associated with the additional images 126, such as, for instance, the tail end of the spiral 209. If the client side application 139 determines that additional item information is required, then in box 419, the client side application 139 transmits a request to the electronic commerce system 116 for the additional item information. If the client side application 139 determines that additional item information is not required, then the client side application 139 returns to box 406.

Figure 5:
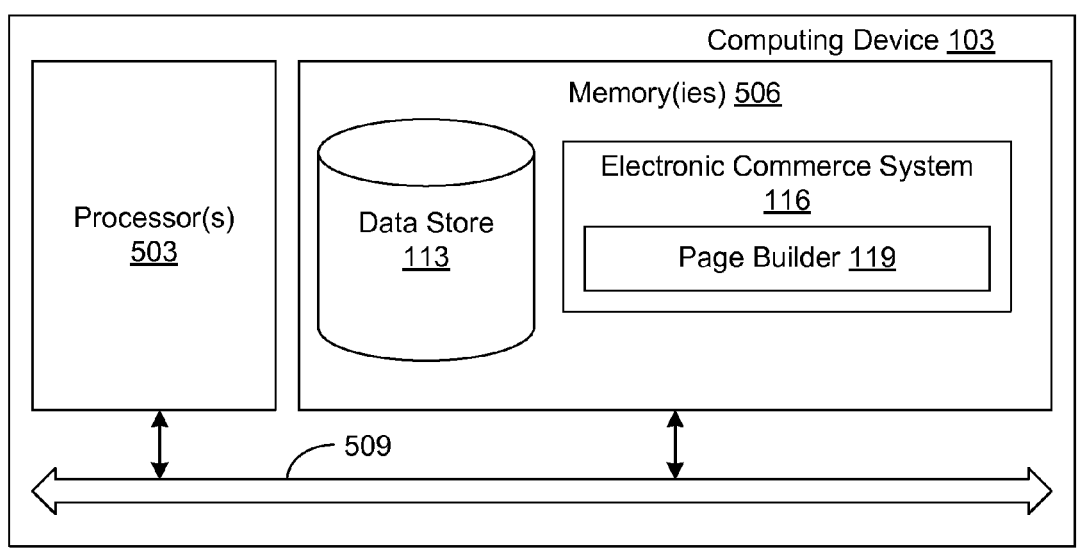
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 116, the page builder 119, and potentially other applications. Also stored in the memory 506 may be a data store 113 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 116, the page builder 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the client side application 139 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116 and the page builder 119, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, wherein when executed, the program causes the first computing device to at least:
   responsive to a search query received from a second computing device, determine a ranking of a plurality of items according to at least one criterion indicated by the second computing device;
   select a plurality of images from a pool of available images, each image in the plurality of images being associated with a respective item of the plurality of items;
   generate a network page that depicts the plurality of images in a spiral, wherein the plurality of images in the spiral are arranged according to the ranking of the plurality of items, wherein a first image of the plurality of images corresponding to a highest ranked item of the plurality of items is located at a focal point of the spiral, and wherein at least a portion of a remainder of the plurality of images are arranged along a path of the spiral in a decreasing order according to the ranking of the plurality of items; and
   upon selection, from the network page when displayed, of an image from the plurality of images in the spiral, generate instructions to shift the plurality of images in the spiral depicted on the displayed network page so that the selected image is shifted to the focal point of the spiral, and each of the plurality of images corresponding to each of the plurality of items ranked higher than a respective item corresponding to the selected image is removed from the plurality of images in the spiral and from the pool of available images.

2. The non-transitory computer-readable medium of claim 1, wherein at least one image of the plurality of images in the spiral is in contact with at least one adjacent image of the plurality of images in the spiral.

3. The non-transitory computer-readable medium of claim 1, wherein the shifting further comprises rearranging a plurality of unselected images in the spiral according to the ranking of the plurality of items.

4. An apparatus comprising:
   a display;
   a memory configured to at least store computer-executable instructions; and
   at least one processor in communication with the memory and the display, that, when implementing the computer-executable instructions, configured to cause a computing device to at least:
      select a plurality of images from a pool of available images, the plurality of images corresponding to a plurality of items;

render on the display the plurality of images in a spiral according to a ranking of the plurality of items, and wherein a first image of the plurality of images is rendered at a focal point of the spiral; and in response to selection of an image from the plurality of images rendered in the spiral, render the selected image on the display at the focal point of the spiral instead of the first image, and remove, from the plurality of images rendered in the spiral and from the pool of available images, at least one image that corresponds to an item having a higher ranking in the ranking of the plurality of items than a respective item that corresponds to the selected image.

5. The apparatus of claim 4, wherein instructions to render the plurality of images or render the selected image are received from another computing device.

6. The apparatus of claim 5, wherein the instructions to render the plurality of images or render the selected image further include instructions to render the plurality of images or the selected image in a network page.

7. The apparatus of claim 4, wherein the first image rendered on the display comprises an image that corresponds to a highest ranking in the ranking of the plurality of items.

8. The apparatus of claim 4, wherein each image of the plurality of images is rendered in a location in the spiral corresponding to a respective rank in the ranking of the plurality of items of a respective item that corresponds to the image.

9. The apparatus of claim 4, wherein at least one image of the plurality of images that is rendered comprises a visual indicator that corresponds to a respective rank in the ranking of the plurality of items.

10. The apparatus of claim 9, wherein the visual indicator comprises at least one of an image size, an image transparency, or an image color.

11. The apparatus of claim 9, wherein the at least one processor is further configured to at least modify the visual indicator for the selected image according to an order of the plurality of images in the spiral.

12. The apparatus of claim 4, wherein the at least one processor is further configured to provide a navigation control for manipulating the plurality of images rendered on the display.

13. The apparatus of claim 4, wherein the image is selected from the plurality of images by a user.

14. The apparatus of claim 4, wherein the at least one processor is further configured to at least add to the plurality of images rendered in the spiral, at least one image previously excluded from the plurality of images rendered in the spiral.

15. A computer-implemented method comprising:

selecting, in at least one computing device, a plurality of images from a pool of available images, wherein the plurality of images are associated with a plurality of ranked items;

rendering for display, in at least one computing device, a network page encoding the plurality of images associated and arranged in a spiral listing, wherein a first image of the plurality of images corresponding to a highest ranked one of the plurality of ranked items is located at a focal point of the spiral listing;

generating, upon selection of a second image of the plurality of images from the network page, instructions to shift the plurality of images in the spiral listing depicted in the displayed network page; and wherein the instructions to shift the plurality of images in the spiral listing comprise:

instructions to shift the second image of the images to the focal point of the spiral listing, and instructions to remove from the spiral listing and from the pool of available images, each of the plurality of images corresponding to each of the plurality of ranked items having a higher rank than a respective ranked item of the plurality of ranked items corresponding to the second image.

16. The computer-implemented method of claim 15, wherein the instructions to shift the plurality of images in the spiral listing further comprise instructions to shift a plurality of unselected images toward the focal point of the spiral listing.

17. The computer-implemented method of claim 15, wherein the instructions to shift the plurality of images in the spiral listing further comprise instructions to modify a visual indicator of each of the plurality of images in the spiral listing according to an order of the plurality of images in the spiral listing.

18. The computer-implemented method of claim 17, wherein the visual indicator comprises at least one of an image size, an image transparency, or an image color.

19. The computer-implemented method of claim 15, wherein the instructions to shift the plurality of images in the spiral listing further comprise instructions to add to the spiral listing at least one image excluded from the spiral listing prior to the shift.

20. The computer-implemented method of claim 15, wherein the computing device is a first computing device and the method further comprises communicating, to at least one second computing device, an indication of at least one item ranking criterion, the plurality of ranked items being ranked based at least in part on the at least one item ranking criterion.

* * * * *